United States Patent
Xu et al.

(10) Patent No.: US 11,225,192 B2
(45) Date of Patent: Jan. 18, 2022

(54) VEHICLE ADVANCING MONITORING SYSTEM

(71) Applicants: BOE Technology Group Co., Ltd., Beijing (CN); Hefei Xinsheng Optoelectronics Technology Co., Ltd., Hefei (CN)

(72) Inventors: Min Xu, Beijing (CN); Chuang Gao, Beijing (CN); Kai Wu, Beijing (CN); Xiaodong Al, Beijing (CN); Jiajia Shan, Beijing (CN); Yu Yang, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 117 days.

(21) Appl. No.: 15/770,789

(22) PCT Filed: Oct. 16, 2017

(86) PCT No.: PCT/CN2017/106384
§ 371 (c)(1),
(2) Date: Apr. 25, 2018

(87) PCT Pub. No.: WO2018/157608
PCT Pub. Date: Sep. 7, 2018

(65) Prior Publication Data
US 2020/0282908 A1 Sep. 10, 2020

(30) Foreign Application Priority Data
Mar. 2, 2017 (CN) .......................... 201710120499.3

(51) Int. Cl.
*B60R 1/00* (2006.01)
*B60Q 9/00* (2006.01)
(Continued)

(52) U.S. Cl.
CPC ................ *B60R 1/00* (2013.01); *B60Q 9/008* (2013.01); *B60R 11/04* (2013.01); *G08G 1/16* (2013.01);
(Continued)

(58) Field of Classification Search
CPC ..... B60R 1/00; B60R 11/04; B60R 2300/101; B60R 2300/105; B60R 2300/20;
(Continued)

(56) References Cited

U.S. PATENT DOCUMENTS

2006/0290482 A1 12/2006 Matsumoto et al.
2007/0182817 A1* 8/2007 Briggance ................ B60R 1/00
348/118
(Continued)

FOREIGN PATENT DOCUMENTS

CN 101443752 A 5/2009
CN 203142520 U 8/2013
(Continued)

OTHER PUBLICATIONS

First Office Action (including English translation thereof) of the priority application No. 201710120499.3 dated Mar. 7, 2019.
(Continued)

*Primary Examiner* — Ryan W Sherwin
(74) *Attorney, Agent, or Firm* — Fay Sharpe LLP

(57) ABSTRACT

The present disclosure relates to a vehicle advancing monitoring system, comprising: a monitoring unit configured to acquire image information in a specified direction of the vehicle, and generate alarm information upon detection of an object with a relative distance to the vehicle less than a
(Continued)

preset value in the specified direction, the specified direction referring to a left rear direction and/or a right rear direction; a display unit configured to display the image information acquired by the monitoring unit; and an alarm unit configured to alarm according to the alarm information. The present disclosure can ensure safe driving.

19 Claims, 2 Drawing Sheets

(51) Int. Cl.
  *B60R 11/04* (2006.01)
  *G08G 1/16* (2006.01)
(52) U.S. Cl.
  CPC ... *B60R 2300/101* (2013.01); *B60R 2300/105* (2013.01); *B60R 2300/20* (2013.01); *B60R 2300/301* (2013.01); *B60R 2300/303* (2013.01); *B60R 2300/8046* (2013.01); *B60R 2300/8093* (2013.01)
(58) Field of Classification Search
  CPC ........ B60R 2300/301; B60R 2300/303; B60R 2300/8046; B60R 2300/8093; B60Q 9/008; G08G 1/16
  See application file for complete search history.

(56) References Cited

U.S. PATENT DOCUMENTS

| | | | |
|---|---|---|---|
| 2013/0278769 A1 | 10/2013 | Nix et al. | |
| 2015/0232028 A1* | 8/2015 | Reardon | B60R 1/12 348/148 |
| 2016/0065796 A1* | 3/2016 | Happy | B60R 1/006 348/376 |
| 2016/0193998 A1* | 7/2016 | Yellambalase | B60W 50/14 348/148 |
| 2017/0076606 A1* | 3/2017 | Gupta | B60Q 9/008 |
| 2017/0158200 A1* | 6/2017 | Wu | G06K 9/00845 |
| 2017/0244902 A1* | 8/2017 | DiMenichi | B60R 1/002 |
| 2018/0033307 A1* | 2/2018 | Tayama | H04S 7/00 |
| 2018/0162274 A1* | 6/2018 | Kim | B60Q 9/008 |

FOREIGN PATENT DOCUMENTS

| | | |
|---|---|---|
| CN | 104554008 X | 4/2015 |
| CN | 104842872 A | 8/2015 |
| CN | 104859544 A | 8/2015 |
| CN | 204659650 U | 9/2015 |
| CN | 105216699 A | 1/2016 |
| CN | 205022461 U | 2/2016 |
| CN | 205202844 U | 5/2016 |
| CN | 105691302 A | 6/2016 |
| CN | 105799596 A | 7/2016 |
| CN | 105857314 A | 8/2016 |
| CN | 106314281 A | 1/2017 |
| CN | 106427780 A | 2/2017 |
| CN | 106853800 A | 6/2017 |
| WO | WO2011136472 A2 | 11/2013 |

OTHER PUBLICATIONS

Chinese Office Action for Chinese Application No. 2017101204699.3 dated Sep. 5, 2018.

International Search Report for PCT/CN2017/106384 dated Jan. 22, 2018.

* cited by examiner

VEHICLE ADVANCING MONITORING SYSTEM

CROSS REFERENCE TO RELATED APPLICATIONS

This application is a 371 of PCT Patent Application Serial No. PCT/CN2017/106384 filed Oct. 16, 2017, which claims priority to Chinese Patent Application No. 201710120499.3, filed with the State Intellectual Property Office of P.R. China on Mar. 2, 2017 and titled "VEHICLE ADVANCING MONITORING SYSTEM", the entire contents of which are incorporated herein by reference.

TECHNICAL FIELD

The present disclosure relates to the field of vehicle safety technology, and more particular to a vehicle advancing monitoring system.

BACKGROUND

Nowadays, automobiles have been increasingly popularized in people's lives. With the continuous advancement of science and technology, many functions of the automobiles are becoming more and more intelligent, improving driving convenience and safety for drivers. Conventionally, a left rearview mirror and a right rearview mirror are mounted on two sides of an automobile, so that the driver can conveniently observe road conditions on the left rear and right rear sides of the automobile in time when driving the automobile, and can make a judgment about his own driving behavior in advance on a basis of the road conditions. However, the driver has to turn his head to observe the rearview mirrors as the rearview mirrors are arranged on the two sides outside the vehicle body. In this case, the angle of his sight deviating from the front is relatively large. If an emergency happens in front, it is likely to cause a traffic accident.

SUMMARY

Embodiments of the present disclosure provide a vehicle advancing monitoring system capable of conveniently monitoring the conditions of other vehicles on the left rear and right rear sides of a vehicle during advancing process of the vehicle, and sending an alarm when an emergency happens.

In order to solve the above technical problems, embodiments of the present disclosure provide the following technical solutions.

A vehicle advancing monitoring system is provided, including: a monitoring unit configured to acquire image information in a specified direction of a vehicle, and generate alarm information upon detection of an object with a relative distance to the vehicle less than a preset value in the specified direction of the vehicle, where the specified direction refers to a left rear direction and/or a right rear direction; a display unit configured to display the image information acquired by the monitoring unit; and an alarm unit configured to alarm according to the alarm information.

Where the display unit is connected with the monitoring unit, and configured to display the image information acquired by the monitoring unit.

Where the system further includes a communication unit, and the display unit is connected with the monitoring unit through the communication unit. The communication unit is configured to transmit the image information acquired by the monitoring unit to the display unit.

Where the monitoring unit includes two monitoring parts arranged on the left and right sides of the vehicle, respectively, and the display unit is further configured to display the monitoring information acquired by the two monitoring parts on different display areas, respectively.

Where the different display areas of the display unit are arranged on two sides of a steering wheel of the vehicle.

Where the display unit is further configured to display the alarm information generated by the monitoring parts on the corresponding display area.

Where the display unit is further configured to control the display areas for displaying the alarm information to blink.

Where the display unit includes a display control part configured to control the display areas for displaying the alarm information to blink.

Where the display control part is further configured to control each of the display areas to display the alarm information generated by the corresponding monitoring.

Where each of the monitoring part is mounted on the vehicle through a rotatable device.

Where the rotatable device is constructed to be retractable inside and extend outside the vehicle body, and is configured to extend out of the vehicle body when the vehicle is started.

Where the monitoring unit is also covered with a protective cover.

Where the vehicle advancing monitoring system further comprises a control part configured to control the monitoring unit, where the control part includes a signal generator arranged on the steering wheel of the vehicle, and the signal generator generates a first signal to control a start-up operation of the monitoring unit or a second signal to control a shutdown operation of the monitoring unit according to a touch input.

Where the monitoring unit is further configured not to generate alarm information upon detection of an object with a relative distance to the vehicle gradually increased but less than a preset value in a specified direction of the vehicle.

Where the monitoring part includes a camera, a radar, and a data processing part respectively connected to the camera and the radar. The data processing part is configured to transmit image information acquired by the camera to the display unit for displaying, determine whether an alarm is required according to information of the distance from the vehicle to the object measured by the radar, and generate alarm information when the relative distance from the object to the vehicle is less than the preset value.

Where the vehicle advancing monitoring system further includes a steering detection unit configured to acquire a steering angle of the vehicle, and send information of the steering angle and a steering direction to the monitoring unit when detecting the steering angle of the vehicle is greater than a preset angle value. The monitoring unit is configured to control the corresponding monitoring part to monitor image and object information on the side of the steering direction according to the information of the steering angle and the steering direction.

Where a light emitting module is arranged around the display unit.

Where the alarm unit includes an alarm control part and an alarm device group, the alarm control part is respectively connected to the monitoring unit and the alarm device group, and the alarm control part is configured to control the alarm device group to alarm according to the received alarm information.

Where the alarm device group includes two alarm devices respectively arranged on the left and right sides outside the vehicle. The alarm control part is configured to control the alarm device(s) on the left side and/or the right side to alarm according to the received alarm information.

The alarm control part is configured to determine a position of the object with a relative distance to the vehicle less than a preset value according to the received alarm information, and control the alarm device at the position of the object to alarm.

The display unit is a liquid crystal display screen or an OLED display screen.

Compared with the prior art, the embodiments of the present disclosure have the following benefits: the vehicle advancing monitoring system provided in the embodiments of the present disclosure can monitor the advancing situations in the left rear and right rear directions of the vehicle in real time, and can alarm in case of a danger, so that the safety of the driver is improved. In addition, the monitoring part in the embodiments of the present disclosure can replace the conventional rearview mirrors, thereby reducing the width of the vehicle and avoiding a collision caused by the rearview mirror during the running process of the vehicle.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

Figure 1:
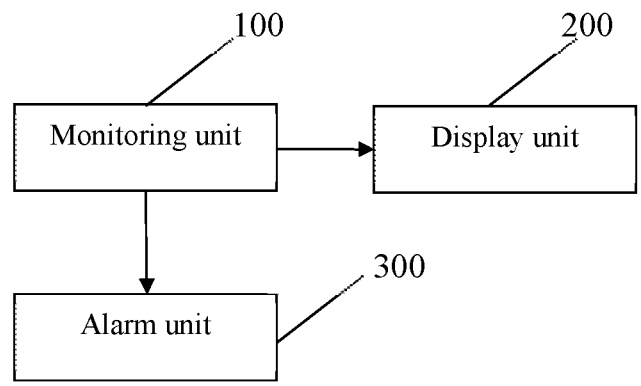
FIG. 1 is a principle diagram of a vehicle advancing monitoring system provided in an embodiment of the present disclosure.

Hereinafter, the embodiments of the present disclosure will be described in detail with reference to the accompanying drawings, but the present disclosure is not limited thereto. It should be understood that various modifications may be made to the embodiments of the present disclosure. Thus, the above descriptions are merely examples of the embodiments, rather than limitation. Other modifications within the scope and principle of the present disclosure may be envisaged by those skilled in the art.

The accompanying drawings, which are incorporated in and constitute a part of the description, illustrate the embodiments of the present disclosure, and explain the principles of the present disclosure in combination with the general description of the present disclosure given above and the detailed description of the embodiments given below.

These and other features of the present disclosure will become apparent from the following description of the preferred forms of the embodiments, given by way of non-limiting examples, with reference to the accompanying drawings.

It should also be understood that although the present disclosure has been described with reference to some specific examples, those skilled in the art shall certainly be able to achieve many other equivalent forms of the present disclosure. The equivalent forms have the features set forth in the claims and hence fall within the protection scope defined thereby.

The foregoing and other aspects, features and advantages of the disclosure become more apparent from the following detailed description in combination with the accompanying drawings.

Specific embodiments of the present disclosure will be described hereinafter with reference to the accompanying drawings. However, it should be understood that the disclosed embodiments are merely examples of the disclosure, and may be implemented in various ways. The details of the well-known and/or iterative functions and structures have not been described so as to avoid obscuring the present disclosure with unnecessary or excessive details. Therefore, specific structural and functional details disclosed in the present disclosure are not to be interpreted as limitation, but are merely used as a basis of the claims and as a representative basis for instructing one skilled in the art to variously implement the present disclosure in any suitable detailed structure substantially.

In the description, any of "in an embodiment", "in another embodiment", "in yet another embodiment" and "in other embodiments" may refer to one or more embodiments among the same or different embodiments of the present disclosure.

Embodiments of the present disclosure provide a vehicle advancing monitoring system, in which: vehicles or other objects in the left rear and right rear directions of a vehicle are monitored, and an alarm is raised in a dangerous situation to notify the driver, thereby avoiding the friction and collision between the vehicles and ensuring the safe driving.

As shown in FIG. 1, a vehicle advancing monitoring system provided by an embodiment of the present disclosure includes: a monitoring unit 100, a display unit 200 and an alarm unit 300, where the monitoring unit 100 is configured to acquire image information in a specified direction of a vehicle, and generate alarm information upon detection of an object with a relative distance to the vehicle less than a preset value in the specified direction, where the specified direction refers to a left rear direction and/or a right rear direction. The monitoring unit 100 can monitor the image information of other vehicles or objects on the left rear side and the right rear side of the vehicle, and the display unit 200 can display the image information acquired by the monitoring unit 100, facilitating the driver to check the image information conveniently without depending on the left rearview mirror and the right rearview mirror. Thus, it is no need for the driver to turn his head for observing, so that the angle of the driver's sight deviating from the front is smaller, thereby reducing the risk coefficient. Meanwhile, the monitoring unit 100 can also monitor an object approaching the vehicle. For example, the monitoring unit 100 can monitor other vehicles whose distances to the vehicle are within a preset distance range, or other objects whose distances to the vehicle are within a preset distance range on the left rear and right rear sides of the vehicle. At this time, the alarm unit 300 can perform an alarm operation to promote the driver. In the embodiments of the present disclosure, the monitoring unit can acquire the image information in the specified direction of the vehicle, and generate an alarm information upon detection of the object with a relative distance to the vehicle less than a preset value in the specified direction, where the specified direction refers to the left rear direction and/or the right rear direction. Exemplarily, the preset value may be 2 meters. Alternatively, the preset value may be set by the driver. For example, a setting button may be arranged on the steering wheel to allow the driver to adjust the preset value by manually pressing the setting button.

Alternatively, the monitoring unit provided in the embodiments of the present disclosure may include at least one monitoring part. Exemplarily, the monitoring unit 100 in the embodiments of the present disclosure may include two monitoring parts 101, one monitoring part 101, or at least three monitoring parts 101. In case of including two monitoring parts 101, the two monitoring parts 101 can be arranged on the left side and the right side of the vehicle, respectively. The monitoring part arranged on the left side of the vehicle is configured to monitor the road condition in a left rear direction of the vehicle, and the monitoring part arranged on the right side of the vehicle is configured to monitor the road condition in a right rear direction of the vehicle. In case of including one monitoring part 101, the monitoring part 101 may be arranged on either the left side or the right side of the vehicle, so as to monitor the advancing condition behind this side of the vehicle; and the monitored advancing condition is displayed through the display unit 200. In case of including at least three monitoring parts 101, the at least three monitoring parts 101 can achieve comprehensive monitoring of the vehicle, resulting in better safety.

In the embodiments of the present disclosure, an example in which two monitoring parts 101 are provided is taken for illustration, but the present disclosure is not limited thereto. The two monitoring parts 101 may be respectively arranged on the two sides of the vehicle (i.e., the left and right sides of the vehicle) for acquiring the image information on the left rear and right rear directions of the vehicle. That is, the monitoring part arranged on the left side of the vehicle is configured to acquire the image information in the left rear direction of the vehicle, and the monitoring part arranged on the right side of the vehicle is configured to acquire the image information in the right rear direction of the vehicle. Upon the detection of, in the left rear or right rear direction of the vehicle, an object with a relative distance to the vehicle less than a preset value, or upon the simultaneous detection of, in the left rear and right rear directions of the vehicle, objects with relative distances to the vehicle less than a preset value, the two monitoring parts 101 generate alarm information. In the embodiments of the present disclosure, the monitoring parts 101 may be fixedly mounted near the A-pillars on both sides of the vehicle, and the A-pillars refer to pillars between the windshield and the front doors.

Exemplarily, the monitoring parts 101 may be arranged at positions where the left and right rearview mirrors are located in an existing vehicle, and may monitor conditions in the rear of the vehicle instead of the left and right rearview mirrors.

In an embodiment, the monitoring parts 101 near the A-pillars on the two sides of the vehicle may be mounted on the vehicle through rotatable devices, thereby conveniently adjusting the monitoring angle, expanding the monitoring view, and effectively ensuring the driving safety of the driver. The rotatable device may be constructed as a gimbal joint capable of realizing 360-degree rotation. In addition, the rotatable device may be retractable inside and outside the vehicle. That is, the monitoring parts 101 may contract into the vehicle through the rotatable devices when the monitoring parts 101 are not used, and may extend outside the vehicle through the rotatable devices when the monitoring parts 101 are used. Optionally, groove structures for accommodating the monitoring parts 101 may be formed near the A-pillars in the vehicle. The rotatable device is mounted in the groove structure. One end of the rotatable device is connected to the monitoring part 101, and the other end of the rotatable device is connected to a retractable device. The extension and the contraction of the retractable device may be controlled through starting and stopping of the vehicle.

For example, when the vehicle is started, the retractable device related thereto extends to enable the monitoring part 101 extend outside the vehicle for monitoring. When the vehicle is stopped, the retractable device related thereto contracts to enable the monitoring part 101 contract into the groove structure. Optionally, the groove structure is further fitted with a protective cover to prevent the monitoring part from being damaged in rain and snow.

Figure 2:
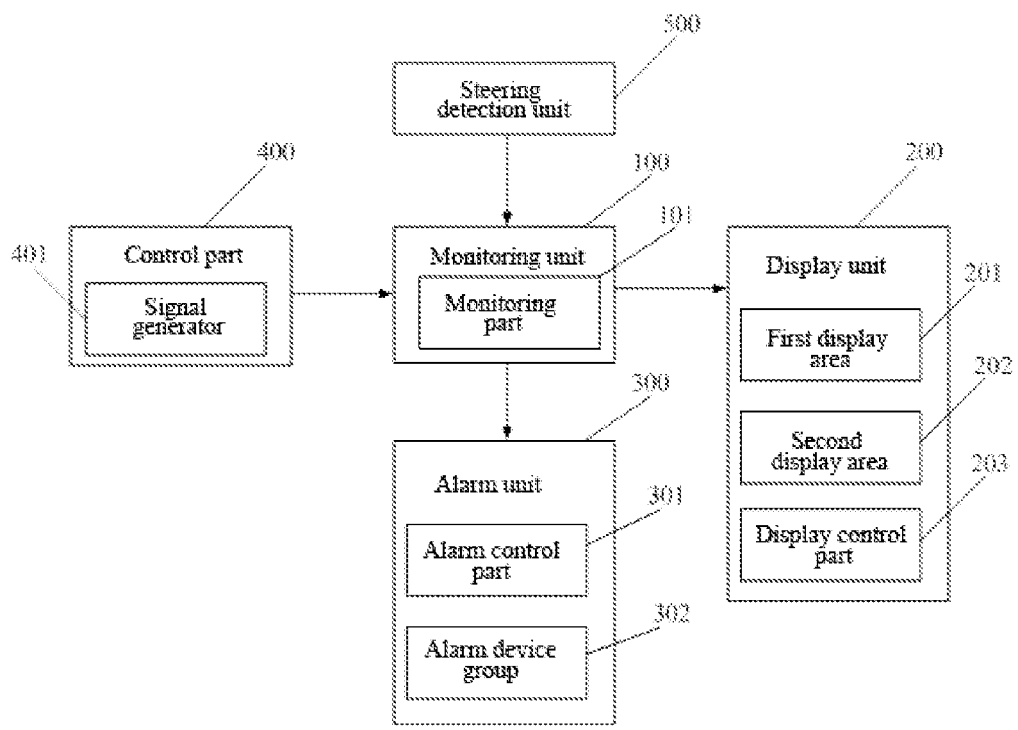
FIG. 2 is a principle diagram of a vehicle advancing monitoring system provided in another embodiment of the present disclosure.

Optionally, in the embodiment shown in FIG. 2, the vehicle advancing monitoring system may further include a control part 400 for controlling the monitoring unit. The control part may include a signal generator 401 arranged on the steering wheel of the vehicle. The signal generator 401 generates a first signal to control a start-up operation of the monitoring unit 100 or a second signal to control a shutdown operation of the monitoring unit 100 according to a touch input. That is, the monitoring unit 100 can also work according to the driver's selection. Optionally, the signal generator 401 may also generate a first signal used to control the start-up operation of the monitoring unit 100, when a vehicle key is detected to be inserted into the start switch of the vehicle. Further, the control part 400 may be further configured to adjust a distance and an angle of the monitoring unit 100 relative to the vehicle upon receiving an adjustment instruction triggered by the driver, so as to enable the driver to obtain a better view in the rear of the vehicle. The adjustment instruction is configure to indicate the distance and the angle of the monitoring unit relative to the vehicle.

Optionally, a control button may be arranged on the steering wheel to allow the driver to adjust the distance and the angle of the monitoring unit relative to the vehicle by manually operating the control button.

In addition, the monitoring part 101 provided in the embodiments of the present disclosure may include a camera for capturing image information, a radar, and a data processing part connected with the camera and the radar. The camera is configured to acquire the image information in the rear of the vehicle. The radar is configured to detect the distance from the vehicle to another object. The data processing part is configured to transmit the image information acquired by the camera to the display unit 200 for displaying, determine whether an alarm is required according to information of the distance from the vehicle to the object measured by the radar, and generate alarm information when the relative distance from the object to the vehicle is less than the preset value. In the embodiments of the present disclosure, the objects may include any static or dynamic objects, and an advancing vehicle. The preset value mentioned above may be any value in the range of 1-30 meters.

Further, the monitoring part 101 may further include a speed sensor configured to acquire the speed of the object moving in the rear of the vehicle with respect to the vehicle. The data processing part may determine whether an alarm is required according to the speed of the object acquired by the speed sensor with respect to the vehicle, and generate alarm information when the speed of the object with respect to the vehicle is greater than a preset speed. Exemplarily, the preset speed may be 5 m/s.

In addition, the display unit 200 in the embodiments of the present disclosure may display the image information acquired by the monitoring unit 100. In the embodiments of the present disclosure, the display unit and the monitoring unit may be connected in various manners. In an alternative manner, the display unit 200 may be connected to the monitoring unit 100. The display unit 200 is configured to display the image information acquired by the monitoring unit 100. Alternatively, the input side of the display unit 200 is connected to the output side of the monitoring unit 100 to receive the image information transmitted by the monitoring unit. That is, the display unit 200 may be respectively connected to each of the monitoring parts 101 to receive the image information transmitted by the monitoring parts 101.

The display unit 200 may receive a selection signal of a selected monitoring part to be displayed. That is, the driver may autonomously select which side of the image information to observe. In other words, the driver may select a corresponding monitoring part 101 to observe. For example, a prompt message of selecting the image information of the left rear direction or the right rear direction may be directly displayed on the display unit 200. Accordingly, the display unit displays the image information in the corresponding direction according to the selected structure.

Figure 3:
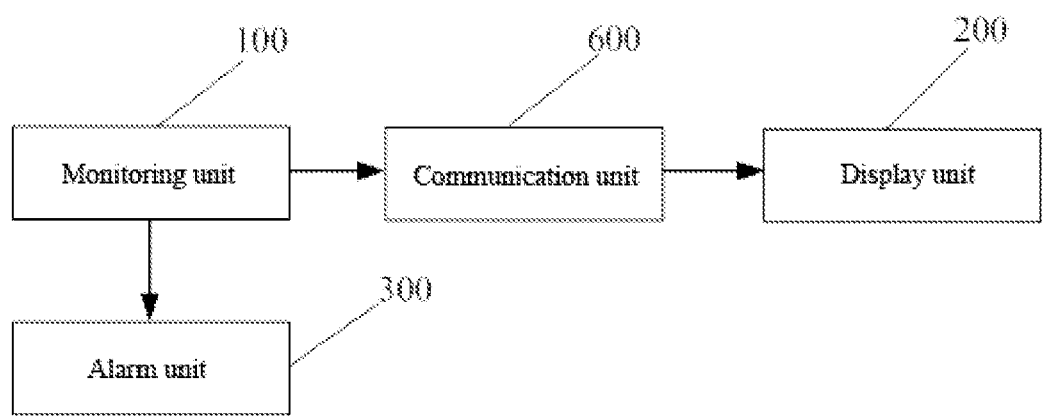
FIG. 3 is a principle diagram of a vehicle advancing monitoring system provided in yet another embodiment of the present disclosure.

In another alternative manner, as shown in FIG. 3, the system may further include a communication unit 600 through which the display unit 200 is connected with the monitoring unit 100. The communication unit 600 is configured to transmit the image information acquired by the monitoring unit 100 to the display unit 200, so that the display unit 200 may display the image information acquired by the monitoring unit 100. That is, the display unit 200 may be connected with each monitoring part 101 through the communication unit 600. Other reference signs in FIG. 3 may refer to those in FIG. 1.

In another embodiment, it is assumed that the monitoring unit includes two monitoring parts respectively arranged on the left and right sides of the vehicle. The display unit may be further configured to respectively display the image information acquired by the two monitoring parts through different display areas. That is, the display unit 200 may include different display areas, such as a first display area 201 and a second display area 202. The first display area 201 and the second display area 202 are configured to respectively display the image information monitored by the two monitoring parts 101 on the left and right sides of the vehicle. For example, the first display area 201 is configured to display the image information acquired by the monitoring part arranged on the left side of the vehicle, and the second display area 202 is configured to display the image information acquired by the monitoring part arranged on the right side of the vehicle. In this way, the driver can conveniently check images in the left and right directions at the same time. In order to facilitate the driver to check the images, optionally, the first display area and the second display area may be arranged at two sides of the steering wheel, respectively. When the driver needs to check the road condition in the rear of the vehicle, his sight can quickly move to the display areas arranged at two sides of the steering wheel. Compared with the manner of checking the rearview mirror, the deviating distance and angle of the driver's sight are greatly reduced. Especially, when checking the road condition in the right rear direction of the vehicle, the driver does not need to turn his head by a larger angle for checking the right rearview mirror. In this way, if there is an emergency in front, the driver can quickly take appropriate measures to avoid traffic accidents caused by the fact that his eyes are taken off the front of the vehicle too long to take the measures in time.

Further, it is assumed that the first display area is configured to display the image information acquired by the monitoring part arranged on the left side of the vehicle, and the second display area is configured to display the image information acquired by the monitoring part arranged on the right side of the vehicle. In order prevent the driver from being confused about the image information displayed in the first and second display areas, the first display area may be arranged on the left side of the steering wheel, and the second display area may be arranged on the right side of the steering wheel.

Alternatively, each display area may further be divided into two sub-areas, i.e., a first sub-area and a second sub-area. The first sub-area is configured to display the image information acquired by the monitoring part, and the second sub-area is configured to display information of an object gradually approaching the vehicle, such as the speed of the object and the relative distance between the object and the vehicle. The speed of the object may be the actual advancing speed of the object, or the advancing speed of the object with respect to the vehicle. Further, the data processing part of the monitoring part may also determine a current danger level of the vehicle based on the data obtained by the camera, the radar and the sensor, and the danger level is displayed by the second sub-area of the display area.

Exemplarily, the display unit may be a liquid crystal display screen or an organic light-emitting diode (OLED) display screen.

In addition, the display unit 200 may further receive alarm information generated by the monitoring unit 100, and may display the alarm information. Alternatively, the alarm information may be displayed in the corresponding display area. That is, the alarm information generated by the corresponding monitoring part is displayed in various display areas. That is, when there is a danger on the left side of the vehicle, the first display area 201 receives the alarm information from the monitoring part 101 on the left side of the vehicle, and the alarm information is displayed in the first display area 201. When there is a danger on the right side of the vehicle, the second display area 202 receives the alarm information from the monitoring part 101 on the right side of the vehicle, and the alarm information is displayed in the second display area 201.

Alternatively, the display unit may be further configured to control the display area for displaying the alarm information to blink. For example, when there is a danger on the left side, the display unit controls the first display area for displaying the alarm information to blink. When there is a danger at the right side, the display unit controls the second display area for displaying the alarm information to blink. The display area can emit a warning light to alert the driver, so as to ensure driving safety. In addition, the display unit may be further configured to control the display area for displaying the alarm information to sound an alarm voice.

Alternatively, the display unit 200 may further include a display control part 203. The display control part 203 may control each of the display areas to display the image information and the alarm information acquired by the corresponding monitoring part. The display control part 203 may further switch the display of the image information monitored by the selected monitoring part 101 according to a received selection signal. In addition, when the monitoring part 101 generates alarm information, the display control part 203 may also correspondingly control the display area corresponding to the monitoring part 101 to display the alarm information and the image information according to the received alarm information, and may also control the display area to blink for prompting. In this embodiment, when receiving the alarm information, the driver can identify the direction of the danger as early as possible and handle it in time.

In the embodiments of the present disclosure, the first display area 201 and the second display area 202 may be arranged at different display positions of the same display, or may be arranged on two displays.

In addition, the alarm unit 300 in the embodiments of the present disclosure may be connected with the monitoring unit 100, receives the alarm information generated by the monitoring unit 100, and alarms according to the received alarm information. The alarm unit 300 in the embodiments of the present disclosure may include one or more of a vibration equipment, a speaker, a blinking light and other alarm devices. The driver may wear the vibration equipment for easily perceiving the vibration alert. The speaker may be arranged in a place convenient for listening to the alarm, such as inside the vehicle. The blinking light may be arranged at a position convenient for checking the blinking.

For example, in the embodiments of the present disclosure, a light emitting module may be arranged around the display unit 100. Exemplarily, blinking lights may be arranged around the display unit 100. When the alarm unit 300 receives the alarm information, the blinking lights blinks, so as to alert the driver. For the display unit having different display areas, the blinking lights in the periphery of the corresponding display area may blink. That is, the blinking lights may arranged around each of the display areas. When the monitoring part 101 corresponding to a display area monitors a danger and generates alarm information, the corresponding display area displays the alarm information and the image information, and the blinking lights around this display area blink.

Alternatively, as shown in FIG. 2, the alarm unit 300 may include an alarm control part 301 and an alarm device group 302. The alarm device group 302 may include one or more of the above vibration equipment, the speaker and the blinking light. The alarm control part 301 is respectively connected with the monitoring unit 100 and the alarm device group 302. The alarm control part 301 is configured to control the alarm device group 302 to alarm according to the received alarm information. In addition, the alarm control part 301 may be respectively connected with the monitoring part 101 and the alarm device group 302, and may accordingly control the alarm device group 201 to alarm according to the received alarm information. The alarm control part 301 may be respectively connected with all of the monitoring parts 101, and may distinguish the monitoring part 101 generating the alarm information as well as the alarm device corresponding to the monitoring part 101, so as to control the corresponding alarm device in the alarm device group 301 to alarm.

Alternatively, the alarm device group includes two alarm devices arranged on the left and right sides outside the vehicle, respectively. The alarm control part is configured to control the alarm device(s) on the left side and/or the right side to alarm according to the received alarm information. The alarm control part is further configured to determine a direction of an object with a relative distance to the vehicle less than a preset value according to the received alarm information, and control the alarm device in the direction of the object to alarm. For example, when the alarm control part determines that there is a violation vehicle in the left rear direction of the vehicle according to the received alarm information, the alarm control part controls the alarm device on the left side to alarm, so as to prompt a driver in the illegal vehicle on the left rear side to drive safely. When the alarm control part determines that there is a violation vehicle in the right rear direction of the vehicle according to the received alarm information, the alarm control part controls the alarm device on the right side to alarm, so as to prompt a driver in the illegal vehicle on the right rear side to drive safely. In this way, drivers in illegal vehicles are prompted, so that the driving safety of the present vehicle is improved. Exemplarily, the alarm device may be a speaker.

Alternatively, the rotatable device is configured to be retractable inside and outside the vehicle, and is configured to extend outside of the vehicle when the vehicle is started.

In addition, in the embodiments of the present disclosure, the monitoring part 101 is further configured not to generate alarm information upon detection of an object with a relative distance to the vehicle gradually increased but less than a preset value in a specified direction of the vehicle, where the specified direction may refer to the left rear direction and/or the right rear direction. That is, when the vehicle is overtaking another vehicle and the distance therebetween is less a preset value, the monitoring part 101 does not generate alarm information, so that the driver is prevented from being disturbed by a false alarming operation.

In another embodiment, as shown in FIG. 2, the system provided by the embodiment of the present disclosure further includes a steering detection unit 500. The steering detection unit 500 may acquire the steering angle of the vehicle, and send information of the steering angle and steering direction to the monitoring unit 100 when detecting that the steering angle of the vehicle is greater than a preset angle value. The monitoring unit 100 may further control the corresponding monitoring part 101 to monitor image and object information on the side of the steering direction according to the received information of the steering angle and steering direction. That is, when the steering detection unit 500 detects that the left steering angle of the vehicle exceeds a preset angle, the monitoring part 101 in the monitoring unit 100 on the left side of the vehicle may monitor the image in the left direction. When the steering detection unit 500 detects that the right steering angle of the vehicle exceeds a preset angle, the monitoring part 101 in the monitoring unit 100 on the right side of the vehicle may monitor the image in the right direction.

In the embodiments of the present disclosure, the steering detection unit can acquire the steering angle of the vehicle, and can send the information of the steering angle and steering direction to the monitoring unit when detecting that the steering angle of the vehicle is greater than the preset angle value. The monitoring unit can generate alarm information when detecting there is an object with a relative distance to the vehicle less than a preset value in the left rear direction and/or the right rear direction of the vehicle. Then, the alarm unit alarms according to the alarm information. Thus, in accordance with the vehicle advancing monitoring system, when the driver is going to change the lane, a prompt message will be sent to the driver if the current road condition does not meet the lane change requirement, so as to prompt the driver not to change the lane as the current condition is not suitable for lane change. Therefore, a traffic accident caused by unsafe lane change as the driver does not notice the object behind the vehicle in time is avoided.

To sum up, the vehicle advancing monitoring system provided by the embodiments of the present disclosure can monitor the advancing situations in the left rear and right rear directions of the vehicle in real time, and can alarm in case of a danger, so that the safety of the driver is improved. In addition, the monitoring part in the embodiments of the present disclosure can replace the conventional rearview mirror, so that the width of the vehicle is reduced, thereby avoiding a collision caused by the rearview mirror when the vehicle is travelling.

A person of ordinary skill in the art may clearly understand that, for the convenience and conciseness for description, the electronic device to which the above method for processing data is applied may refer to the corresponding description in the product embodiments mentioned above, and will not be repeated herein.

The foregoing embodiments are only exemplary embodiments of the present disclosure, and are not intended to limit the present disclosure. The scope of protection of the present disclosure is defined by the claims. Within the substance and protection scope of the present disclosure, a person of ordinary skill in the art may make various modifications or equivalent substitutions to the present disclosure and these modifications or equivalent substitutions shall fall within the scope of protection of the present disclosure.

What is claimed is:

1. A vehicle advancing monitoring system, comprising:
    a monitor configured to acquire image information in a specified direction of a vehicle, and generate alarm information upon detection of an object with a relative distance to the vehicle less than a preset value in the specified direction, wherein the specified direction refers to a left rear direction and/or a right rear direction;
    a display screen configured to display the image information acquired by the monitor; and
    an alarm configured to perform an alarm operation according to the alarm information; and
    wherein the vehicle advancing monitoring system further comprises a steering detector configured to acquire a steering angle of the vehicle, and send information of the steering angle and a steering direction to the monitor when detecting the steering angle of the vehicle is greater than a preset angle value; and
    the monitor is configured to control the corresponding monitoring part to monitor the image information and object information on the side of the steering direction according to the information of the steering angle and the steering direction; and
    wherein the vehicle advancing monitoring system further comprises a rotatable device which is retractable inside and outside the vehicle, and the monitor contracts into the vehicle through the rotatable device when the monitor is not used, and extends outside the vehicle through the rotatable device when the monitor is used; and
    wherein a groove structure for accommodating the monitor is arranged near an A-pillar in the vehicle, the rotatable device is mounted in the groove structure, one end of the rotatable device is connected to the monitor, and the other end of the rotatable device is connected to a retractable device.

2. The vehicle advancing monitoring system of claim 1, wherein the display screen is connected to the monitor, and is configured to display the image information acquired by the monitor.

3. The vehicle advancing monitoring system of claim 2, wherein the monitor comprises two monitoring parts respectively arranged on the left and right sides of the vehicle; and the display screen is further configured to respectively display the monitoring information acquired by the two monitoring parts through different display areas.

4. The vehicle advancing monitoring system of claim 3, wherein the different display areas of the display screen are arranged on two sides of a steering wheel of the vehicle.

5. The vehicle advancing monitoring system of claim 3, wherein the display screen is further configured to display the alarm information generated by the monitoring part through the display area corresponding thereto.

6. The vehicle advancing monitoring system of claim 5, wherein the display screen is further configured to control the display area for displaying the alarm information to blink.

7. The vehicle advancing monitoring system of claim 6, wherein the display screen comprises a display controller configured to control the display area for displaying the alarm information to blink.

8. The vehicle advancing monitoring system of claim 7, wherein the display controller is further configured to control each of the display areas to display the alarm information generated by the corresponding monitoring part.

9. The vehicle advancing monitoring system of claim 3, wherein the two monitoring parts are mounted on the vehicle through a rotatable device.

10. The vehicle advancing monitoring system of claim 3, wherein the monitoring part comprises a camera, a radar, and a data processor connected with the camera and the radar; and the data processor is configured to transmit the image information acquired by the camera to the display screen for displaying, determine whether an alarm is required according to distance information between the vehicle and the object and measured by the radar, and generate alarm information when the relative distance from the object to the vehicle is less than the preset value.

11. The vehicle advancing monitoring system of claim 1, wherein the system further comprises a communication circuitry; the display screen is connected with the monitor through the communication circuitry; and the communication circuitry is configured to transmit the image information acquired by the monitor to the display screen.

12. The vehicle advancing monitoring system of claim 1, wherein the monitor is further provided with a protective cover.

13. The vehicle advancing monitoring system of claim 1, further comprising a control part configured to control the monitor,
    wherein the control part comprises a signal generator arranged on a steering wheel of the vehicle; and the signal generator generates a first signal to control a start-up operation of the monitor or a second signal to control a shutdown operation of the monitor according to a touch input.

14. The vehicle advancing monitoring system of claim 1, wherein the monitor is further configured not to generate alarm information when detecting an object with a relative distance to the vehicle gradually increased but less than a preset value in a specified direction of the vehicle.

15. The vehicle advancing monitoring system of claim 1, wherein a light emitting module is arranged around the display screen.

16. The vehicle advancing monitoring system of claim 1, wherein the alarm comprises an alarm controller and an alarm device group, wherein the alarm controller is connected with the monitor and the alarm device group; and the alarm controller is configured to control the alarm device group to alarm according to the received alarm information.

17. The vehicle advancing monitoring system of claim 16, wherein the alarm device group comprises two alarm devices arranged on the left and right sides outside the vehicle, respectively; and the alarm controller is configured to control alarm device(s) on the left side and/or the right side to alarm according to the received alarm information.

18. The vehicle advancing monitoring system of claim 17, wherein the alarm controller is configured to determine the direction of an object with a relative distance to the vehicle less than a preset value according to the received alarm information, and control an alarm device located in the direction of the object to alarm.

19. The vehicle advancing monitoring system of claim 1, wherein the display screen is a liquid crystal display screen or an OLED (organic light emitting diode) display screen.

* * * * *